United States Patent [19]
Zampini et al.

[11] Patent Number: 5,175,771
[45] Date of Patent: Dec. 29, 1992

[54] VCA DECODING SCHEME FOR MULTIPLE VTR CONFIGURATION OF AN AUDIO FOR VIDEO MIXER

[75] Inventors: Michael A. Zampini, Boca Raton; Alan Flum, Tamarac, both of Fla.

[73] Assignee: Sony Corporation of America, Park Ridge, N.J.

[21] Appl. No.: 672,918

[22] Filed: Mar. 21, 1991

[51] Int. Cl.⁵ .................. H04B 3/00; H04B 1/00; H04R 27/00
[52] U.S. Cl. .................................... 381/119; 381/81; 381/85
[58] Field of Search ............... 381/119, 123, 77, 80, 381/81, 85

[56] References Cited
U.S. PATENT DOCUMENTS 4,281,314  7/1981  Hunt .
4,479,240 10/1984  McKinley ................. 381/119
4,635,288  1/1987  Stadius .
4,764,812  8/1988  Hamley .
4,879,751 11/1989  Franks et al. .
4,885,792 12/1989  Christensen et al. .

Primary Examiner—James L. Dwyer
Assistant Examiner—Jack Chiang
Attorney, Agent, or Firm—Ronald P. Kananen

[57] ABSTRACT

An audio mixer system for use with a parallel editor interface is disclosed. Use of a configuration selector to select a desired configuration of a plurality of multi-channel devices is disclosed in order to enable such various configurations and reconfigurations. In one embodiment, the output of the configuration selector is provided to a memory to select prestored commands to be provided to appropriate channels. According to another embodiment, the configuration selection signals are decoded and supplied to multiplexers in combination with editor control signals to enable the editor control signals to be routed to appropriate channels.

5 Claims, 10 Drawing Sheets

FIG. 3

| MODE | 1 L | 1 R | 2 L | 2 R | 3 L | 3 R | 4 L | 4 R | 5 L | 5 R | 6 L | 6 R | 7 L | 7 R | 8 L | 8 R | 9 L | 9 R | 10 L | 10 R | 11 L | 11 R | 12 L | 12 R |
|---|---|---|---|---|---|---|---|---|---|---|---|---|---|---|---|---|---|---|---|---|---|---|---|---|
| 0 | VTR 1 (4 CH.) | | | | VTR 2 (4 CH.) | | | | VTR 3 (4 CH.) | | | | VTR 4 (4 CH.) | | | | VTR 5 (4 CH.) | | | | VTR 6 (4 CH.) | | | |
| 1 | VTR 1 (4 CH.) | | | | VTR 3 | VTR 3 | VTR 4 | VTR 4 | VTR 5 | VTR 5 | VTR 6 | VTR 6 | VTR 7 | VTR 7 | VTR 8 | VTR 8 | VTR 9 | VTR 9 | | | | | | |
| 2 | VTR 1 (4 CH.) | | | | VTR 2 (4 CH.) | | | | VTR 3 | VTR 3 | VTR 4 | VTR 4 | VTR 5 | VTR 5 | VTR 6 | VTR 6 | VTR 7 | VTR 7 | VTR 8 | VTR 8 | | | | |
| 3 | VTR 1 (4 CH.) | | | | VTR 2 (4 CH.) | | | | VTR 3 (4 CH.) | | | | VTR 4 | VTR 4 | VTR 5 | VTR 5 | VTR 6 | VTR 6 | VTR 7 | VTR 7 | | | | |
| 4 | VTR 1 (4 CH.) | | | | VTR 2 (4 CH.) | | | | VTR 3 (4 CH.) | | | | VTR 4 (4 CH.) | | | | VTR 5 | VTR 5 | VTR 6 | VTR 6 | | | | |
| 5 | VTR 1 | VTR 1 | VTR 2 | VTR 2 | VTR 3 | VTR 3 | VTR 4 | VTR 4 | VTR 5 (4 CH.) | | | | VTR 6 (4 CH.) | | | | | | | | | | | |
| 6 | VTR 1 | VTR 1 | VTR 2 | VTR 2 | VTR 3 | VTR 3 | VTR 4 | VTR 4 | VTR 5 | VTR 5 | VTR 6 | VTR 6 | VTR 7 | VTR 7 | VTR 8 | VTR 8 | | | | | | | | |
| 7 | VTR 1 | VTR 1 | VTR 2 | VTR 2 | VTR 3 | VTR 3 | VTR 4 | VTR 4 | VTR 5 | VTR 5 | VTR 6 | VTR 6 | VTR 7 | VTR 7 | | | | | | | | | | |
| 8 | VTR 1 | VTR 1 | VTR 2 | VTR 2 | VTR 3 | VTR 3 | VTR 4 | VTR 4 | VTR 5 | VTR 5 | VTR 6 | VTR 6 | | | | | | | | | | | | |
| 9 | VTR 1 | VTR 1 | VTR 2 | VTR 2 | VTR 3 | VTR 3 | VTR 4 | VTR 4 | VTR 5 | VTR 5 | | | | | | | | | | | | | | |

MIXER CHANNEL NUMBER

VCA DECODING SCHEME FOR MULTIPLE VTR CONFIGURATION OF AN AUDIO FOR VIDEO MIXER

CROSS REFERENCE TO RELATED APPLICATIONS

Reference is made to commonly owned co-pending application entitled "VTR CONFIGURATION DECODING SCHEME FOR AUDIO MIXER PARALLEL EDITOR INTERFACE" Application Ser. No. 07/072,920 filed on even date herewith.

FIELD OF THE INVENTION

This invention relates to an audio for video mixer under control of a parallel editor interface to enable various configurations of two and four-channel VTRs or other multichannel devices.

BACKGROUND OF THE INVENTION

In order to accomplish audio editing, it is known to use a mixer to control a plurality of multi-channel devices, such as VTRs, for example. It is also known that an editor may be advantageously used to control the mixer via a parallel editor interface to enable various VTR functions including PREVIEW/REVIEW and FADE UP/DOWN, for example. In general, the PREVIEW/REVIEW functions require a digital signal (e.g. 5 or 0 v.) to be supplied to an appropriate channel to activate the channel. The FADE UP/DOWN functions generally require analog signals (0-5 v, e.g.) to be supplied to the appropriate channels. These signals are commonly referred to as VCA signals and are supplied to voltage controlled amplifiers associated with the channels. Other analog and digital control signals may be used to implement other known functions.

Generally, in a mixer system, a mixer is connected to a plurality of devices such as VTRs or other multi-channel devices, for example. The mixer may also be connected to an editor via a parallel editor interface to enable editor control of the mixer. However, such prior systems generally enable editor control of either only all four-channel devices or only all two-channel devices. This is clearly an undesirable limitation. Some systems allow for the use of hard wired jumpers to enable various combinations of two and four-channel devices to be used. This avoids the aforedescribed undesirable limitation, but adds a new drawback in that using hard wired jumpers is time consuming and can be difficult if several devices are to be connected. Additionally, if it is desired to reconfigure the devices, for example, to replace a four-channel device with 2 two-channel devices, rewiring is necessary, once again requiring a time consuming operation.

To further elaborate, if a mixer has twenty channels, for example, it is possible to connect 5 four-channel devices or 10 two-channel devices or some combination thereof, for example, 2 four-channel devices and 6 two-channel devices.

In order for the editor control signals to be sent to a selected device, it must be known what channels of the mixer are associated with that device. If, as in the prior art, all four-channel devices, e.g., are used, it is known that device 1 corresponds to channels 1-4, device 2 corresponds to channels 5-8, etc. For this reason, some prior art systems do not allow the flexibility of using two and four-channel devices together under editor control. However, as described above, some systems allow a combination of two and four-channel devices but require hard wired jumpers to enable editor control signals to be sent to the appropriate device. The disadvantages of these systems are pointed out above.

SUMMARY OF THE INVENTION

It is an object of this invention to overcome these and other drawbacks of the prior art.

It is another object of the invention to enable a mixer to be easily configured and reconfigured for many different combinations of two and four-channel VTRs.

It is a further object of this invention to provide a configuration selector to enable multiple configurations of VTRs to be easily implemented under editor control.

It is a further object of this invention to enable analog control signals to be provided to a mixer based on preselected configuration information.

It is a further object of this invention to enable digital control signals to be provided to a mixer based on preselected configuration information.

These and other objects of the invention are accomplished in the following manner.

An audio mixer under editor control, via a parallel editor interface, is connected to a plurality of VTRs or other devices including multi-channel devices. According to a novel aspect of the invention, there is provided a configuration selector for selecting a desired configuration of the plurality of devices. The configuration can include various combinations of two and four-channel VTRs, for example. According to a first embodiment, the output of the configuration selector is provided to a multiplexer or other type of switching apparatus which is also responsive to editor control signals for routing editor control signals (e.g., analog signals) to selected channels of the mixer to enable various operations including FADE UP/DOWN.

According to a second embodiment of the invention, the output of the configuration selector is provided to a memory for selecting a portion of a memory address. Signals from the editor are also provided to the memory to select another portion of the memory address. Based on the selected address, previously stored control signals (e.g., digital signals), can be provided to selected channels of the mixer to enable various operations including PREVIEW/REVIEW.

According to a third embodiment of the invention, the output of the configuration selector is provided to both the switching apparatus and to the memory to enable both analog and digital control signals to be supplied to selected channels of the mixer to enable various functions to be performed including those described above with respect to the first and second embodiments.

DETAILED DESCRIPTION OF THE PREFERRED EMBODIMENT

Figure 1:
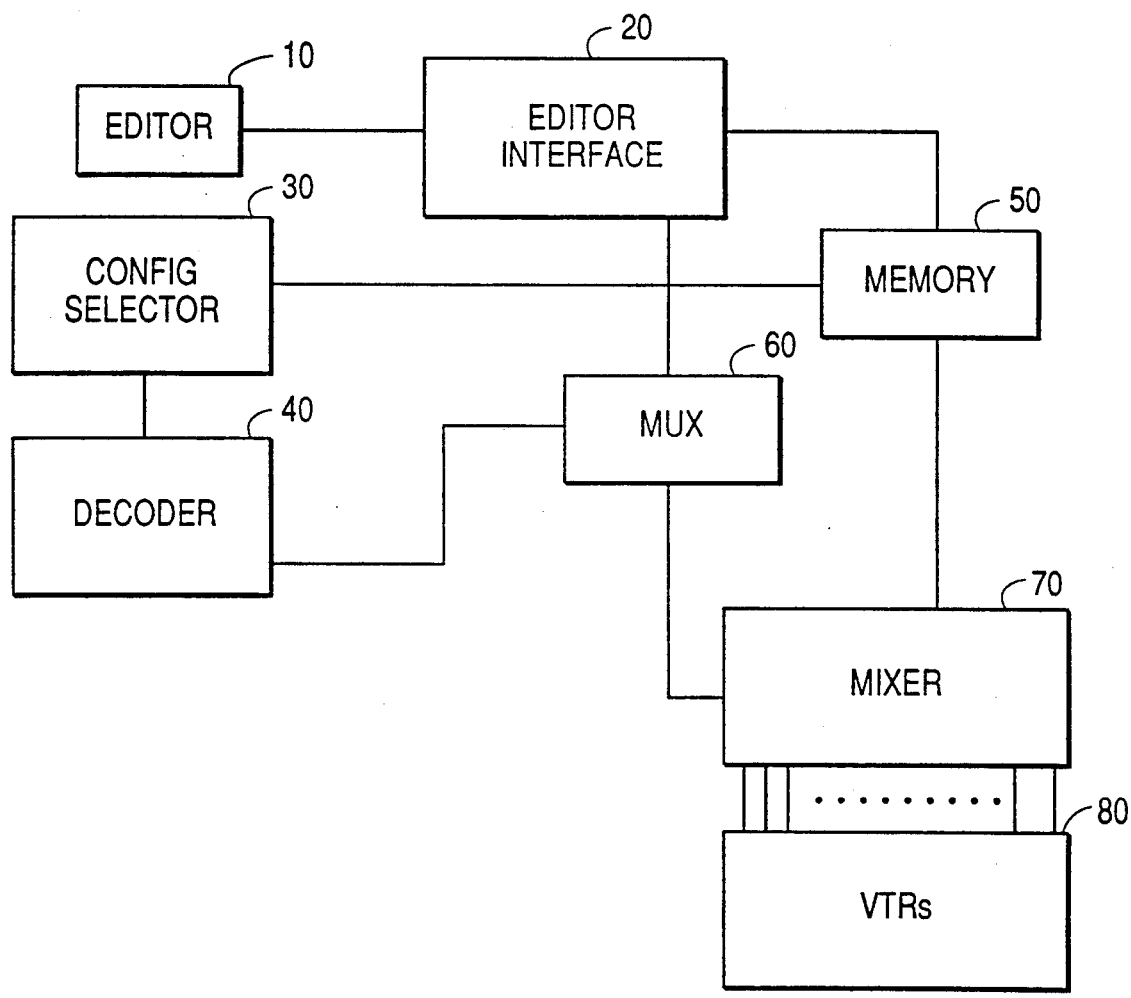
FIG. 1 is a simplified block diagram illustrating a mixer system according to the present invention.
Figure 2:
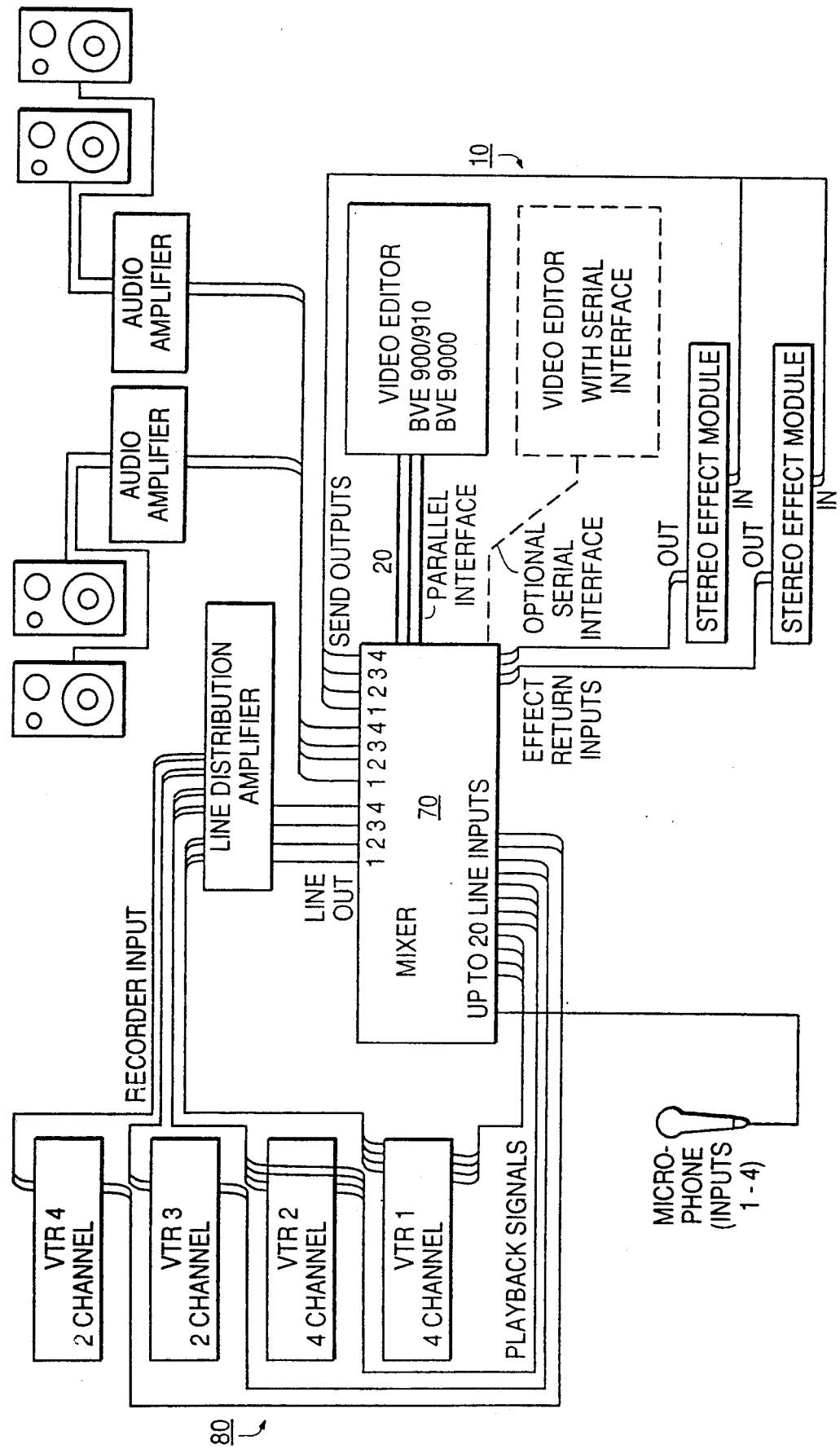
FIG. 2 is a more detailed representation of the mixer system shown in FIG. 1.

Shown in FIG. 1 is a block diagram exemplifying a mixer system according to a preferred embodiment of the present invention. A more detailed representation of the system is shown in FIG. 2. The system of FIGS. 1 and 2 includes an editor 10 connected through an interface, preferably a parallel editor interface 20, to a mixer 70, which in turn is connected to a plurality of devices to be controlled by the editor, e.g., a plurality of multi-channel VTRs 80. For convenience only, the following description will refer to VTRs, but it is to be understood that the invention is not so limited. Other devices, including other multi-channel devices, may be used with this invention.

Figures 1, 4A:
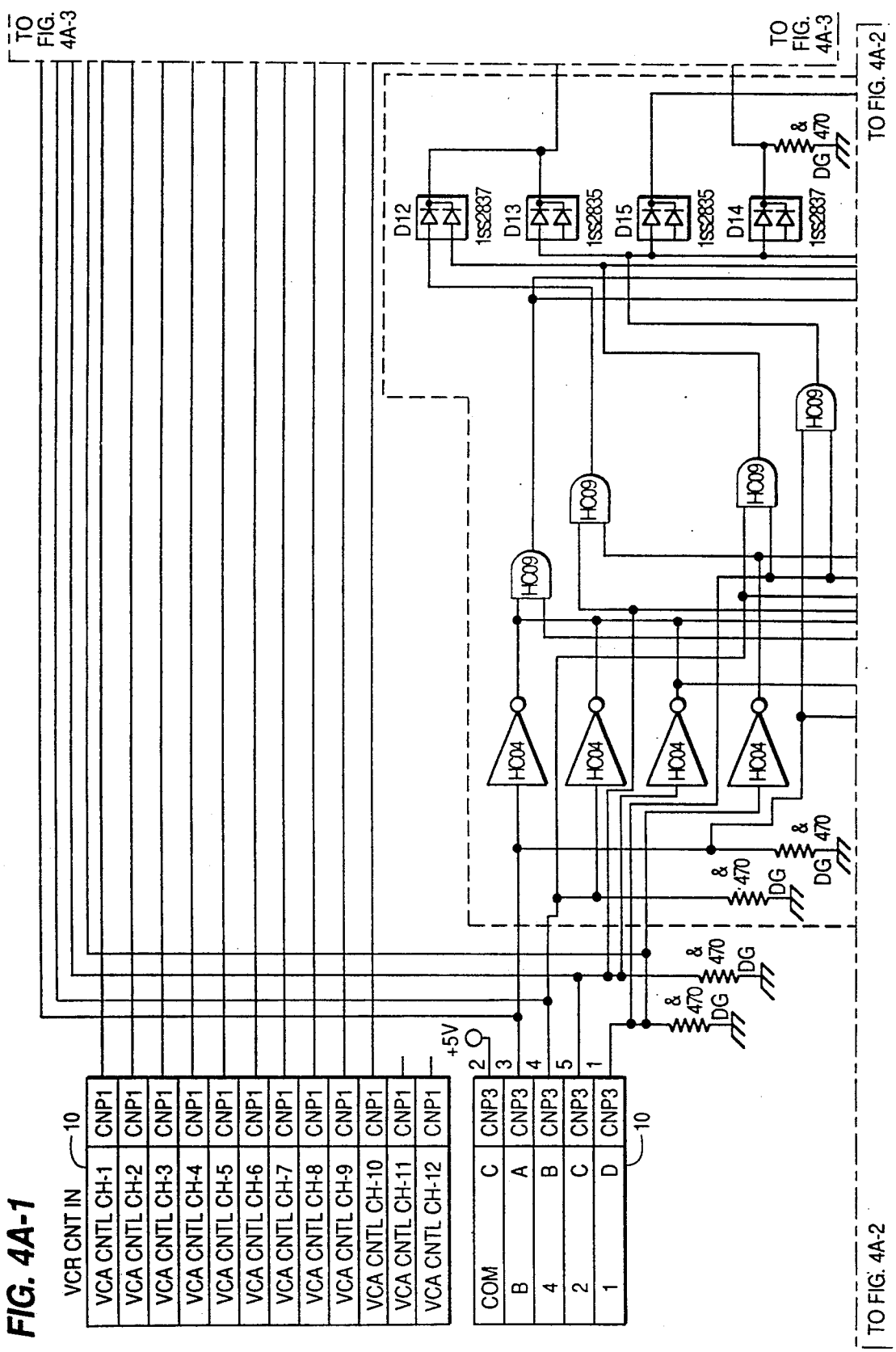
FIGS. 4A and 4B collectively are a detailed schematic diagram illustrating the mixer system according to a preferred embodiment of the present invention.
Figures 2, 4A:
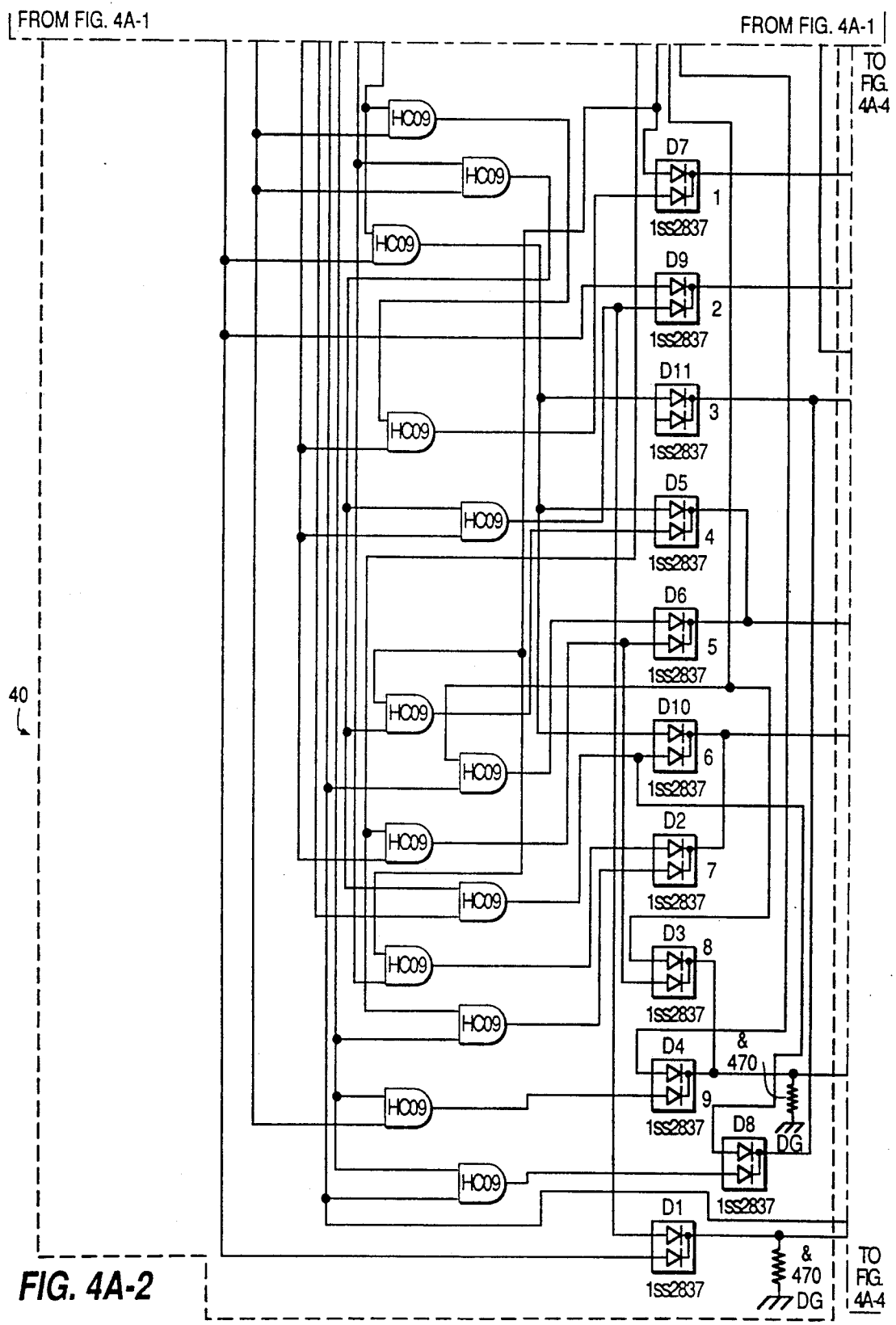
Figures 3, 4A:
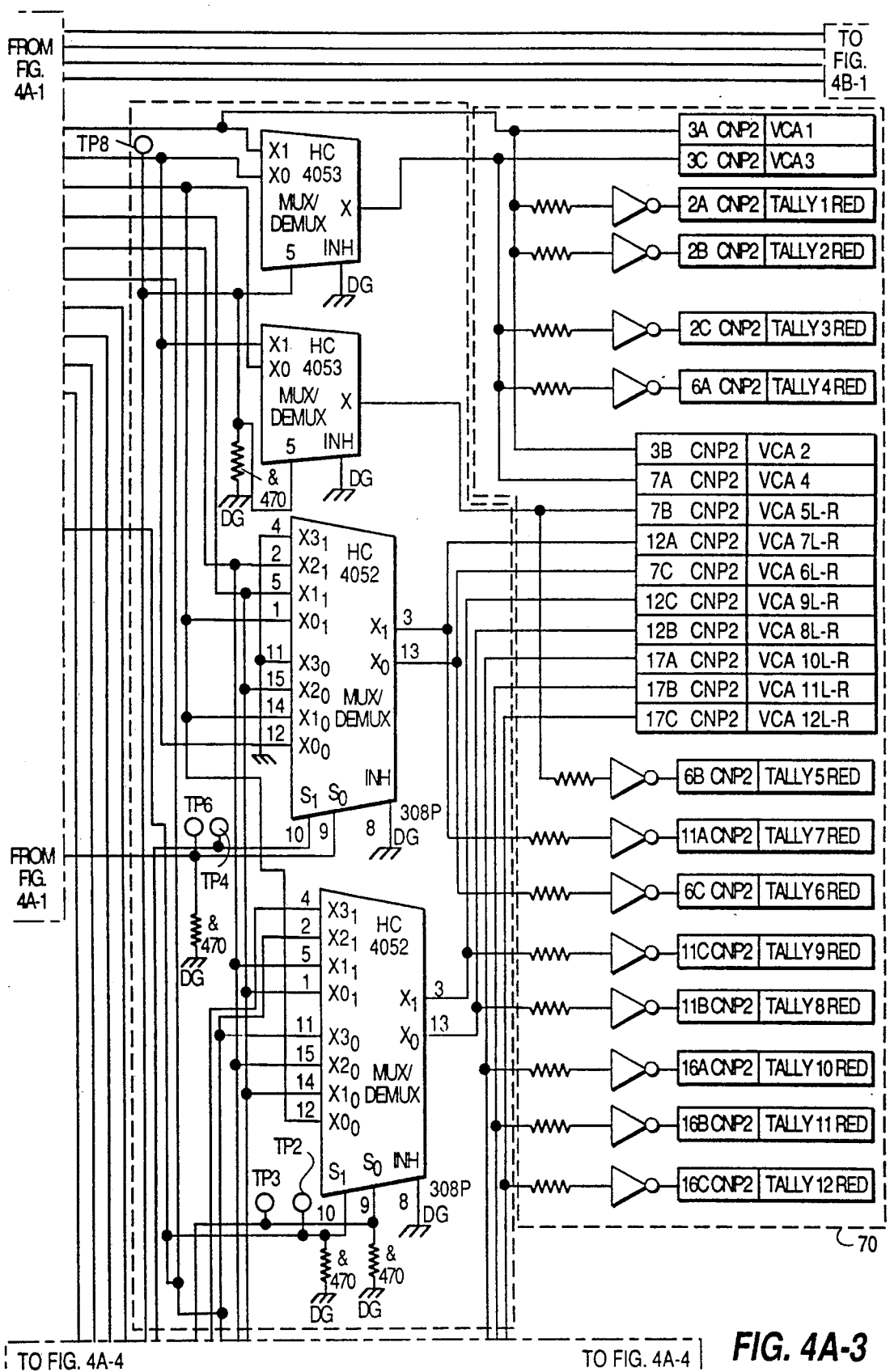
FIG. 3 is a VTR configuration chart illustrating various configurations of two and four-channel VTRs and a corresponding Mode number for each such configuration.
Figures 4, 4A:
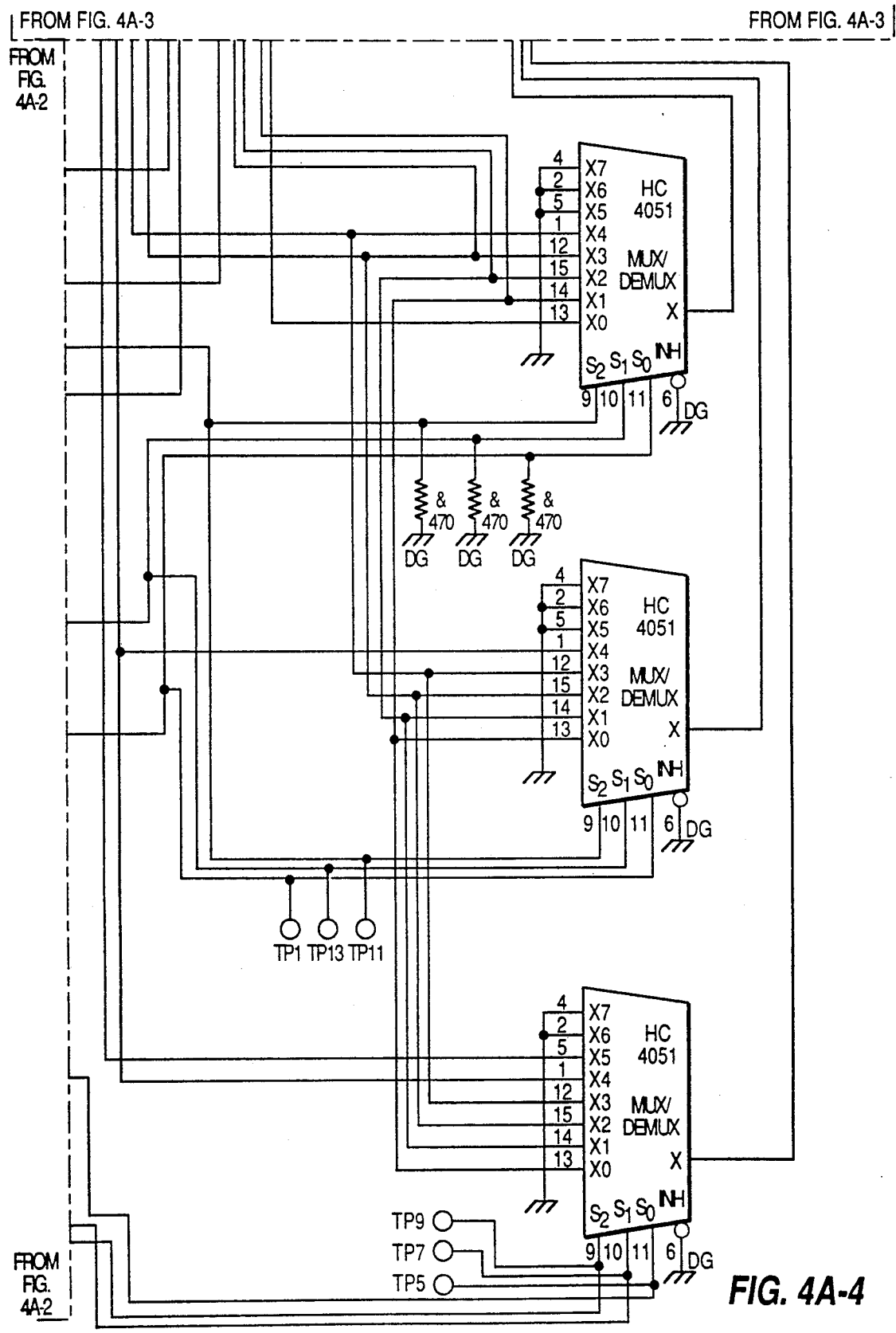

As shown in FIGS. 2 and 3, some of the VTRs 80 may be of the two-channel type and some may be of the four-channel type. For editor control operations, it is necessary to know which configuration, i.e., a particular combination of two and four-channel VTRs, is being used so that if an operator desires to PREVIEW the audio from VTR 2, e.g., the signals from the channels associated with VTR 2 can be monitored. In general, this occurs by activating the channels associated with VTR 2 in a manner discussed in more detail below.

According to a novel aspect of the present invention, there is provided, as shown in FIG. 1, a configuration selector 30, to enable the Mode number of a selected configuration of VTRs to be selected. The Mode number corresponding to a selected configuration can be obtained from a configuration chart, for example, as shown in FIG. 3.

The VTR Configuration Chart of FIG. 3 shows one example of various possible configurations of two and four-channel VTRs. Of course, the invention is not limited to these configurations and more or less combinations may be desirable. Additionally, devices other than VTRs may be used.

As shown in FIG. 3, for a mixer with 20 channels (1–4, 5L, 5R, 6L, 6R, . . . 12L, 12R) ten different configurations may be desirable, for example. A first configuration could be 5 four-channel VTRs as indicated by Mode 0. Mode 1 corresponds to 1 four-channel VTR and 8 two-channel VTRs. Mode 2 corresponds to 2 four-channel VTRs and 6 two-channel VTRs, and so on, down to Mode 9 which corresponds to 10 two-channel VTRs.

According to another novel aspect of the invention, a desired configuration is set up and the Mode number corresponding to the desired configuration is selected using the configuration selector 30 (FIG. 1, for example) which may be a rotary thumbwheel switch bearing numbers 0–9 or any other suitable selection apparatus. If more than 10 configurations are desired, two thumbwheel switches bearing digits 0–9 could be used to permit 100 combinations, and so forth.

Of course, other selection apparatus and displays can be used and such variations will be readily apparent to one of ordinary skill in the art. Other methods of associating a Mode number with a particular configuration and other configuration selection devices will also be readily apparent to one of ordinary skill in the art.

According to a first embodiment, with reference to FIG. 1, the output of the configuration selector 30 is provided to a decoder 40 so that the output can be decoded in a known manner to generate a signal corresponding to the selected configuration. The output of the decoder is then applied to a multiplexer 60 which supplies signals, e.g., VCA signals, to selected channels of mixer 70 associated with the VTRs 80.

The multiplexer 60 is responsive to the decoded configuration selector output signals and editor control signals sent from the editor 10. In this embodiment, the multiplexer 60 is used to cause editor signals, e.g., analog VCA control signals, to be appropriately routed to channel(s) associated with a selected VTR. For example, according to a first embodiment, the MUX can be used to route VCA control signals from editor 10 to individual or plural channels of the mixer 70 to enable FADE UP/DOWN functions to be implemented (in a known manner) for one or more channels of the VTRs 80.

A preferred circuit layout for implementing this embodiment is presented in FIG. 4A, the operation of which will be readily apparent to one of ordinary skill in the art in connection with the description contained herein. Reference numerals appearing in FIGS. 4A (and 4B) correspond to those described in connection with FIG. 1. As shown in FIG. 4A, various editor control signals from the editor 10 are supplied to the multiplexer 60. Additionally, output signals from the configuration selector 30 are decoded by a decoder 40 and are also supplied to the multiplexer 60. These signals are collectively used by the multiplexer to route the editor control signals to the mixer 70.

The decoding of the configuration selector output signals may be implemented by hard wired logic circuitry as shown in FIG. 4A or by using PALs, for example. Other types of decoding may also be used as will be readily apparent to one of ordinary skill in the art.

According to this embodiment, the editor control signals are generally comprised of a portion containing data indicating which device is to be controlled and a portion containing function data, for example, VCA control signals.

This embodiment is advantageously used with, but is not limited to, analog control signals, e.g., 0–5 volt signals, which are to be supplied to one or more channels of the mixer. Preferably these analog signals may be VCA control voltages which are supplied to a particular channel based on selections made at the editor.

If the configuration is changed, the operator merely needs to manipulate the configuration selector 30 to the Mode number corresponding to the new configuration, thereby automatically causing the signals from decoder 40 to change and concomitantly causing the multiplexer 60 to reroute the signals to the appropriate channels.

Figures 1, 4B:
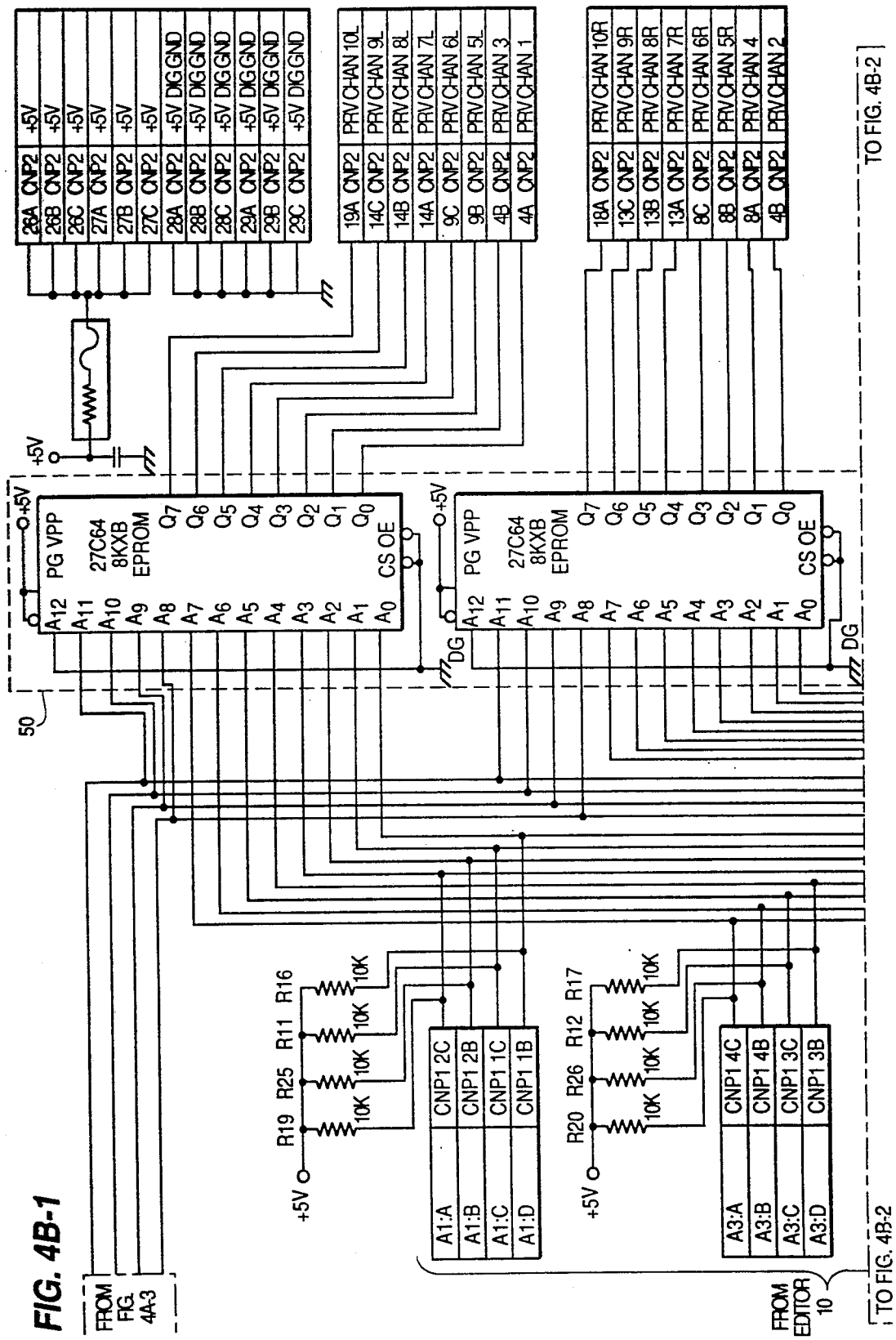
Figures 2, 4B:
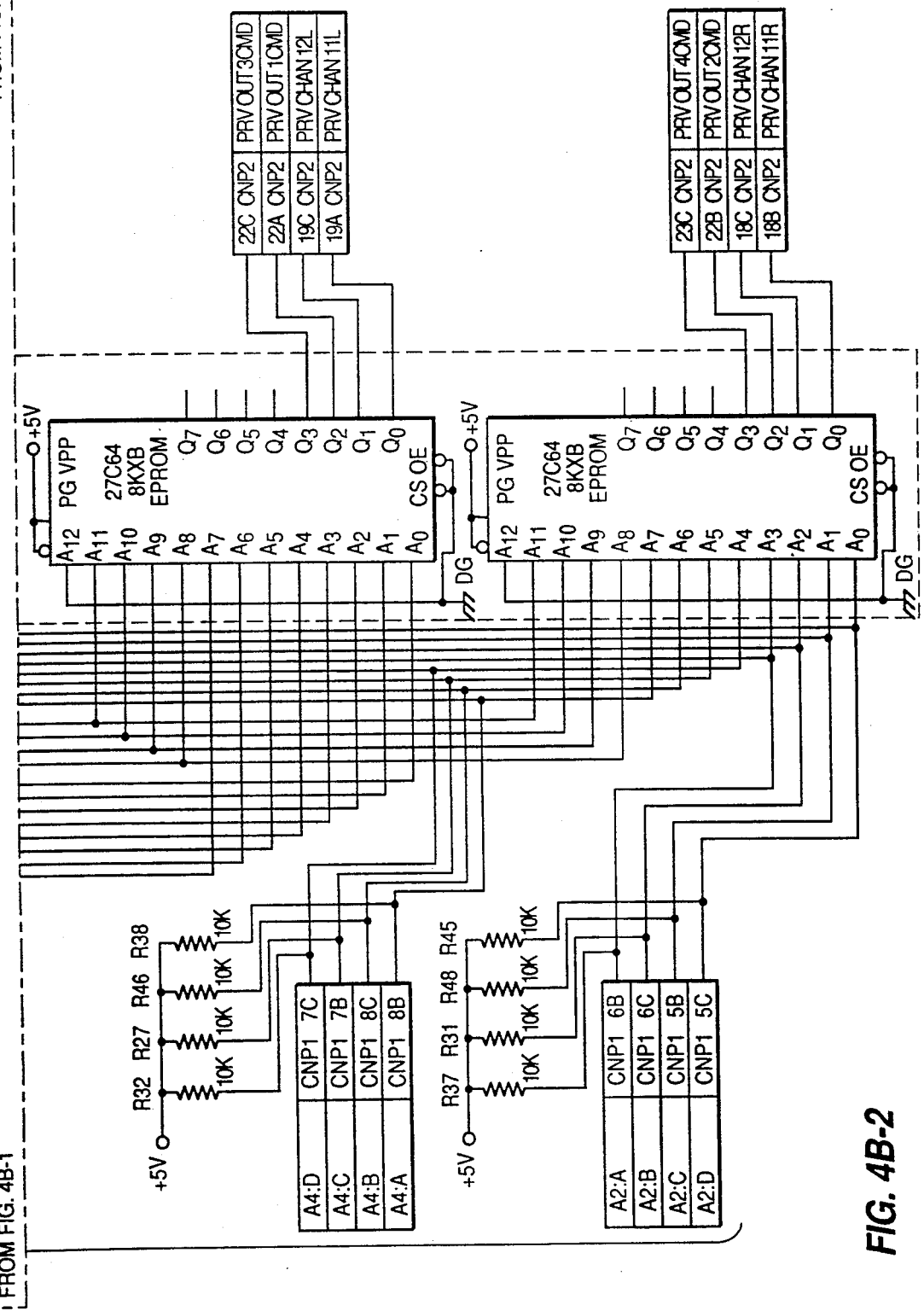
Figures 3, 4B:
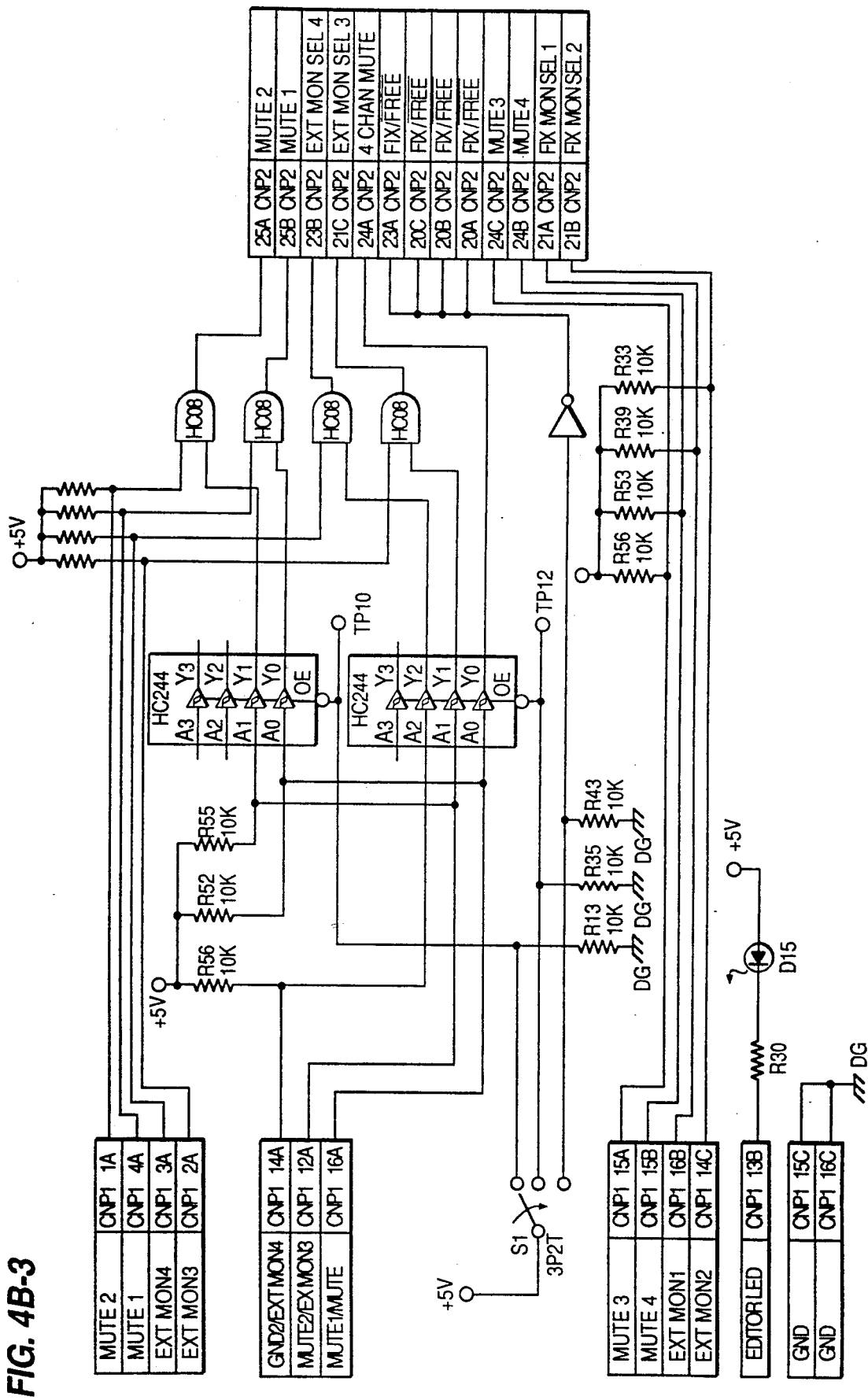

According to a second embodiment, with reference to FIG. 1, the output of the configuration selector 30 is supplied to a memory 50. The memory 50 may be one or more EPROMS containing previously stored data. This data may correspond to digital control signals for controlling the activation of various channels of the mixer 70. According to a preferred embodiment, the data may be stored in a format comprising pages and portions of pages (e.g., memory locations) which are accessed by providing address signals to the memory 50. As best illustrated in FIG. 4B, a portion of the address is selected based on the output signal from a configuration selector 30. Preferably, this output selects a page of the memory 50. Another portion of the address corresponding, for example, to a portion of the selected page (memory location), is selected based on control signals from the editor 10. The data contained in the selected memory location of the selected page is then output to the mixer 70. For example, selected data may enable one or more channels of a selected VTR to be activated to enable a PREVIEW operation.

According to this embodiment, the editor control signals are generally comprised of a portion containing data indicating which device is to be controlled and a portion containing function data, for example, PREVIEW control signals.

For example, assume the VTRs are configured in a manner corresponding to Mode 3 (FIG. 3). If a user desires to preview VTR 4, e.g., then it would be desired to control the mixer to activate channels 9L and 9R (i.e., the channels associated with VTR 4). Preferably, this is done by providing a HIGH (or LOW) level logic signal (e.g., 5 or 0 volts) to channels 9L and 9R. To accomplish this, the configuration selector 30 would be set to Mode 3 thereby generating an output signal which is supplied a first address information to select the appropriate page of memory 50. This page preferably contains data corresponding to the configuration of Mode 3, in this case. The editor 10, in response to the operator's selection of PREVIEW VTR 4, would supply an editor control signal as second address information to the memory 50 to enable data stored in a memory location associated with the particular portion of the selected page of memory 50 to be supplied to mixer 70. This data is preferably a signal which would activate channels 9L and 9R, in this case. In this way, the PREVIEW VTR 4 command can be executed.

If the VTR configuration is changed, the operator merely needs to manipulate the configuration selector 30 to the Mode number corresponding to the new configuration, thereby automatically selecting a new page of the memory 50 to enable editor control signals to once again be appropriately supplied to the channels associated with the selected device despite the reconfiguration of the devices.

This embodiment is advantageously used with, but is not limited to, supplying a digital HIGH or LOW level logic signal (e.g. 5 or 0 volts) to one or more channels of the mixer. These digital signals may be used, e.g., to activate or deactivate a particular channel. Of course if desired, analog signals could also be stored and accessed in a similar manner.

According to a third embodiment, the output of the configuration selector 30 is supplied to both the multiplexer 60 (through the decoder 40) and the memory 50 to enable a combination of the separately aforedescribed features to be implemented. In this way, both analog and digital control signals can be most efficiently supplied to appropriate channels even if different VTR configurations are used.

Referring again to FIG. 3, there is shown only one configuration for each combination of two and four-channel VTRs capable of use with a 20 channel system. That is to say, for example, if 1 four-channel VTR and 8 two-channel VTRs are desired, the four-channel VTR is shown to be associated with the first four-channels (1-4). Of course, if it were desired to enable various permutations of a given configuration, additional Mode numbers could be assigned. For example, as indicated above, Mode 1 corresponds to 1 four-channel VTR and 8 two-channel VTRs, where channels 1-4 are associated with the four-channel device and the remaining channels are associated with the two-channel devices. If, for example, it were desired to have 2 two-channel devices associated with channels 1-4, the four-channel device associated with 5L, 5R, 6L and 6R and the remaining two-channel devices associated with channels 7L, 7R-12L, 12R, this would constitute a permutation of the configuration of Mode 1, i.e., a different ordering of the combination of 1 four-channel device and 8 two-channel devices.

The foregoing is a detailed description of the preferred embodiments. The scope of the invention, however, is not so limited. Various alternatives will be readily apparent to one of ordinary skill in the art. The invention is only limited by the claims appended hereto.

We claim:

1. An audio mixer system comprising:
    audio mixer means for mixing audio signals from a plurality of devices comprising a combination of devices having a first number of channels and devices having a second number of channels;
    editor control means operatively connected with said audio mixer means for controlling the audio mixer means by editor control signals;
    configuration selection means for enabling selection of a desired configuration of said plurality of devices and for producing configuration selection signals corresponding to a selected configuration; and
    switching means responsive to said editor control signals and said configuration selection signals for selectively routing said editor control signals to said plurality of devices.

2. The audio mixer system of claim 1 wherein said editor control means comprises a parallel editor control means.

3. The audio mixer system of claim 1 wherein said configuration selection means comprises one or more thumbwheel switches.

4. The audio mixer system of claim 1 wherein said switching means comprises a multiplexer.

5. The audio mixer system of claim 1 wherein said plurality of devices comprises a combination of two and four-channel VTRs and said desired configuration corresponds to a particular combination of said two and four-channel VTRs.

* * * * *